(12) United States Patent
Sharma et al.

(10) Patent No.: US 8,996,187 B2
(45) Date of Patent: Mar. 31, 2015

(54) OPTIMAL STORAGE SIZING FOR INTEGRATING WIND AND LOAD FORECAST UNCERTAINTIES

(75) Inventors: Ratnesh Sharma, Fremont, CA (US); Sudipta Dutta, Elmsford, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 391 days.

(21) Appl. No.: 13/543,817

(22) Filed: Jul. 7, 2012

(65) Prior Publication Data

US 2013/0024044 A1    Jan. 24, 2013

Related U.S. Application Data

(60) Provisional application No. 61/508,856, filed on Jul. 18, 2011.

(51) Int. Cl.
*G05D 11/00* (2006.01)
*H02J 3/14* (2006.01)
*H02J 3/32* (2006.01)
*H02J 3/38* (2006.01)
*H02J 3/00* (2006.01)

(52) U.S. Cl.
CPC ... *H02J 3/14* (2013.01); *H02J 3/32* (2013.01); *H02J 3/386* (2013.01); *H02J 2003/003* (2013.01); *F05B 2260/8211* (2013.01); *Y02B 70/3225* (2013.01); *Y02E 70/30* (2013.01); *Y02E 10/763* (2013.01); *Y04S 20/222* (2013.01); *Y04S 10/54* (2013.01)
USPC ........................................................ 700/291

(58) Field of Classification Search
CPC ................................. H20J 3/886; Y02E 70/30

USPC ........................................... 700/286, 291, 297
See application file for complete search history.

(56) References Cited

U.S. PATENT DOCUMENTS

2011/0231028 A1*    9/2011    Ozog ............................ 700/291

OTHER PUBLICATIONS

Brekken et al., Optimal Energy Storage Sizing and Control for Wind Power Applications, IEEE Transactions on Sustainable Energy, vol. 2, No. 1, Jan. 2011.
Gonzalez et al, Stochastic joint optimization of wind generation and pumped-storage units in an electricity market, Meeting, 2004. IEEE Jun. 6-10, 2004 pp. 2309-2314 vol. 2 Digital Object Identifier 10.1109/PES.2004.1373298.
Singh et al, Power System Adequacy and Security Calculations Using Monte Carlo Simulation incorporating Intelligent System Methodology, 9th International Conference on Probabilistic Methods Applied to Power Systems KTH, Stockholm, Sweden—Jun. 11-15, 2006.
Makarov et al, Incorporating Wind Generation and Load Forecast Uncertainties into Power Grid Operations, PNNL, Jan. 2010.

(Continued)

*Primary Examiner* — Kenneth Lo
*Assistant Examiner* — Chad Rapp
(74) *Attorney, Agent, or Firm* — Joseph Kolodka; Akitaka Kimura

(57) ABSTRACT

Systems and methods are disclosed to manage energy system by receiving load forecasts and power generator forecasts with uncertainty specification; performing stochastic optimization on the load and power generation forecasts; determining an optimal storage sizing for energy balancing; and validating the optimal storage sizing; wherein the power generator is connected to an energy storage device with the optimal storage sizing.

19 Claims, 4 Drawing Sheets

(56) References Cited

OTHER PUBLICATIONS

T. Brekken, A. Yokochi, A. Jouanne, Z. Yen, H. Hapke, D. Halamay, "Optimal energy storage sizing and control for wind power power applications," IEEE Trans. Sustainable Energy, vol. 2, No. I, Jan. 2011, pp. 69-77.

J. G-Gonzalez, R. Moraga, L. Mates, and A. Mateo, "Stochastic joint optimization of wind generation and pumped-storage units in an electricity market," IEEE Trans. Power Systems, vol. 23, No. 2, May 2008, pp. 460-468.

C. Singh, X. Luo, and H. Kim, "Power system adequacy and security calculations using Monte Carlo simulation incorporating intelligent system methodology," Proc. 9'h International Conference on Probabilistic Methods applied to Power Systems, KTH, Stockholm, Sweden, Jun. 2006.

Makarov et al, "Sizing Energy Storage to Accommodate High Penetration of Variable Energy Resources," IEEE Transactions on Sustainable Energy, vol. 3, No. 1, Jan. 2012, p. 34.

Y. Makarov, Z. Huang, P. V. Etingov, J. Ma, R. T. Guttromson, K. Subbarao, B. B. Chakrabarti,"Incorporating wind generation and load forecast uncertainties into power grid operations," PNNL Wind Energy Management System EMS Integration Project, Jan. 2010, pp. 2.3. http://www.ntis.gov/ordering.htm.

\* cited by examiner

OPTIMAL STORAGE SIZING FOR INTEGRATING WIND AND LOAD FORECAST UNCERTAINTIES

This application claims priority to Provisional Application Ser. No. 61/508,856 filed Jul. 18, 2011, the content of which is incorporated by reference.

BACKGROUND

Goals of achieving energy independence and concerns about depleting fossil fuel reserves and environmental impacts of energy generation has stimulated a lot of interest in research in the area of renewable and sustainable energy. Wind power is one of the fastest growing renewable technologies in the world at present. The United States with 35 GW of installed wind capacity in 2009 has the goal of achieving 20% wind power penetration by 2030. Increasing wind penetration into existing power grids in turn increases the problems caused by the inherent variability and uncontrollable nature of the wind resource. Since the system loads are also variable and represented by forecasts, balancing supply and demand for electric power is becoming increasingly difficult.

Addressing the issues of variability of wind power by incorporating energy storage units operating in combination with wind farms is an attractive idea. A number of wind to storage projects are also being planned and implemented across the U.S. However, a question that is often unaddressed is the optimal size of the required storage unit for a given system. This work proposes a methodology to compute the optimal storage size required for a system consisting of wind generation and load.

One of the main characteristics of renewable power such as wind and solar is the inherent variability and uncontrollability. Even with state-of-the art forecasting techniques, actual generation can be substantially deviated from the forecasted values. In addition, the system load is also variable and needs to be forecasted ahead of time for unit commitment and system planning and operation purposes. Although daily loads follow a pattern, every forecast is associated with a certain degree of uncertainty. In a system consisting of only renewable generation and load, with minimum or no connection to the grid, the task of energy balancing is extremely difficult. Incorporation of energy storage units is being considered as a possible solution to this problem. However, energy storage units till date are expensive. Hence the question that arises is, given a generation-load system, what is the optimal amount of storage required. This invention investigates the storage size required by a system consisting of a renewable generation and a load in meeting certain specified reliability indices and considering the forecast uncertainties.

The incorporation of forecast uncertainties into processes such as generation scheduling, load following, is critical for improving system performance, maintaining system reliability, and minimizing expenses related to the system balancing functions. However, the power system demand and supply balancing process is traditionally based on deterministic models. Scheduling and load following processes use load and wind power generation forecasts to achieve future balance between demand and supply of electric energy. Since the actual load and wind generation can deviate from their forecasts significantly, with increasing penetration of renewable resources, it becomes increasingly difficult to guarantee whether the system would actually be able to meet the required reliability criteria. Hence, it is important to address the uncertainty problem by including the sources of uncertainty including forecasts of load and wind generation into consideration. In this work, a methodology has been presented for incorporating uncertainties associated with wind and load forecast. The consideration of uncertainties is a unique feature that makes this work a significant step forward toward the integration of renewable resources such as wind.

SUMMARY

In one aspect, systems and methods are disclosed to manage energy system by receiving load forecasts and power generator forecasts with uncertainty specification; performing stochastic optimization on the load and power generation forecasts; determining an optimal storage sizing for energy balancing; and validating the optimal storage sizing; wherein the power generator is connected to an energy storage device with the optimal storage sizing.

In one embodiment, an optimal size of an energy storage unit is determined for energy balance in a system consisting of wind (renewable) generation and load, taking into consideration the uncertainties in forecasts of both loads and the wind (renewable) power generation. The optimal storage parameters determined are the energy capacity and the power capacity. The minimum initial energy required to be stored over a planning period is also computed. The methodology can be easily modified to address a system with other renewable sources of generation such as solar power. In addition, since no specific storage technology had been considered, the methodology can consider any specific type of storage and scaled to consider a renewable-storage system at the grid level or at a smaller level for systems such as smart buildings. The idea is also applicable to the microgrid systems with renewable generation and with minimum or no connection to electric grids. The optimization model is formulated as a stochastic linear programming problem considering two random quantities, load and wind (renewable) generation. The reliability index of the system is evaluated in terms of the LOLP (Loss of Load Probability). Another reliability index, LOEP (Loss of Energy Probability), is defined to determine the probability of a wind (renewable) energy spillage event due to excess wind (renewable) generation that cannot be accommodated in the system.

Advantages of the preferred embodiments may include one or more of the following. The system is effective in determining the optimal storage size required for energy balance purposes in a renewable generation-load system taking into account forecast uncertainties and meeting required reliability criteria. The approach is also effective in assessing performance and reliability metrics of a system with existing storage facilities.

DESCRIPTION

Figure 1:
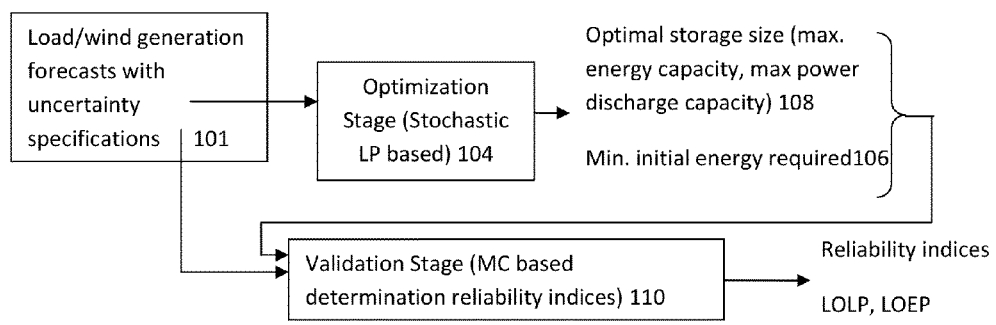
FIG. 1 shows an exemplary system to determine optimal storage for a system with wind generation and a lumped load.

FIG. 1 shows an exemplary system to determine optimal storage for a system with wind generation and a lumped load. In module 101, the system receives load forecast as well as wind generation forecasts, both with uncertainty specifications. The input from module 101 is provided to an optimization stage 104, which can be Stochastic LP based. The use of Stochastic Linear programming formulation addresses the probabilities in the objective function itself. There is no need to do an exhaustive simulation study to determine storage size which is computationally extremely expensive. The result is a determination of optimal storage sizes that are 'more reliable' and that is quantifiable from a reliability viewpoint. The result is a determination of optimal storage size 109 and minimum required energy 106. That information, along with output of module 101, is provided to a validation stage 110, which can be an MC based determination of reliability indices in one embodiment.

In one embodiment, wind power and load forecasts are available for every interval over the planning period. In addition, the forecast uncertainties quantified by confidence intervals or probability distribution of errors are also available. The probability distribution of forecast errors is taken to be Gaussian with zero mean and known standard deviation which may vary between different intervals.

The energy storage is used as a means for balancing the energy demand and supply. The optimal sizing of the energy storage unit in presence of load and wind generation forecast errors is computed by a stochastic linear program. An energy storage unit can be characterized by its energy capacity (MWh), power capacity (MW), round-trip efficiency, and ramping capability. In one embodiment, the optimal energy capacity and the optimal power discharge capacity of the storage unit are computed. The energy storage unit is modeled by energy continuity equations and hence depicted as a limited energy plant. The minimum initial energy of the storage unit is also obtained.

Two optimization targets have been considered in one implementation, namely, (i) optimal storage sizing while minimizing the under-generation in the system thereby achieving a low or zero value of loss-of-load probability (LOLP), and (ii) optimal storage sizing while minimizing the magnitude of energy deviations, i.e. both over and under-generation.

The system of FIG. 1 determines 'how much' of energy storage is required for operating the system in a reliable manner. Since size of storage is associated with a cost figure, an optimum must be reached between this and the cost associated with energy deviations (spilled wind energy and unmet demand). The optimal storage size has been computed for energy balance in a system consisting of wind generation and load taking into consideration the uncertainties in forecasts of both load and the wind generation. Optimal storage size is given by the optimal energy capacity and the optimal power capacity. The minimum initial stored energy is also computed. The methodology presented can be easily modified to address a system with other renewable sources of generation such as solar power. In addition, since no specific storage technology had been considered, the methodology can be modified to consider any specific type of storage and scaled to consider a renewable-storage system at the large-scale grid level or at a small-scale system such as smart buildings. The idea is also applicable in the microgrid framework with renewable generation and with minimum or no connection to the electric grid.

Figure 2:
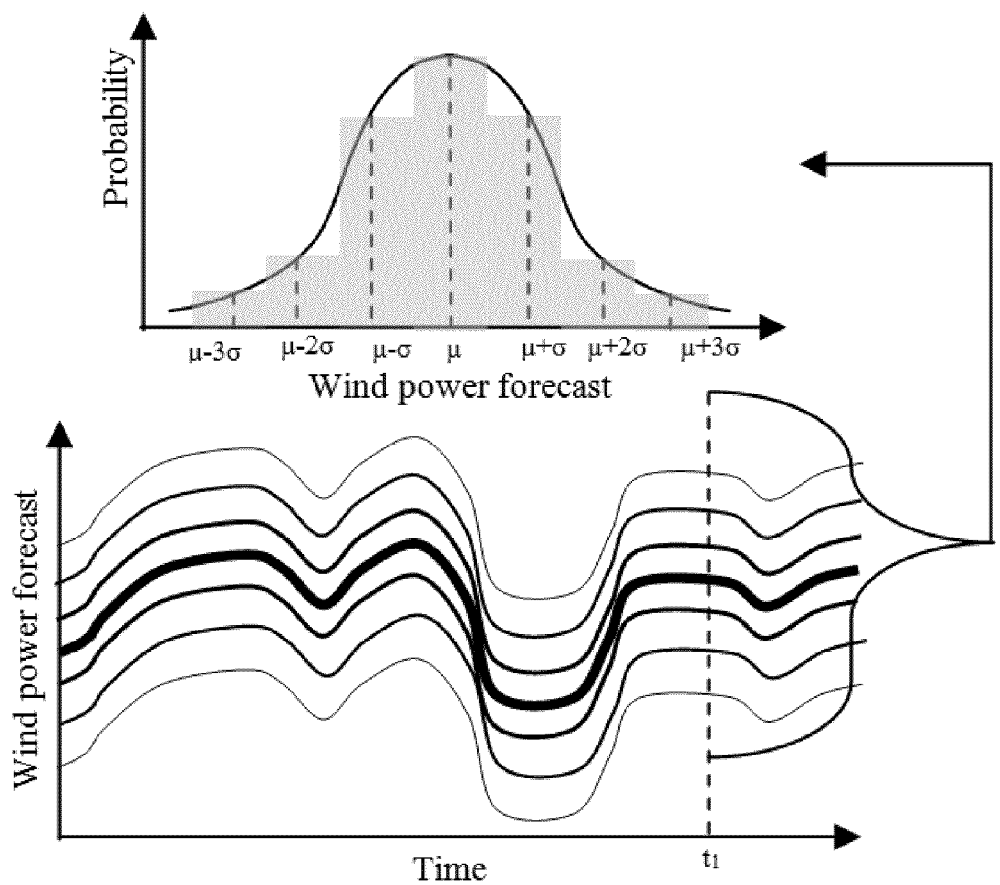
FIG. 2 demonstrates the discretization process for the wind power forecasts.

FIG. 2 demonstrates the discretization process for the wind power forecasts. The continuous probability distribution curve is discretized to quantize the forecasts into different levels. The process of discretization is required for the stochastic linear program formulation. In this work, the discrete levels considered are $[\mu-3\sigma, \mu-2\sigma, \mu-\sigma, \mu, \mu+\sigma, \mu+2\sigma, \mu+3\sigma]$ with corresponding probabilities obtained from the given probability distribution function. Here $\mu$ is the sum of the forecast at an interval and the mean of the forecast error. Since the forecast error is assumed to have a zero mean, $\mu$ represents the forecasted wind power. Also, $\sigma$ represents the known standard deviation of the forecast error which can vary between different intervals.

A similar procedure is followed for the load forecast curve, i.e. the continuous probability distribution curve is discretized to generate discrete load levels with probabilities from the continuous probability distribution function.

Figure 3:
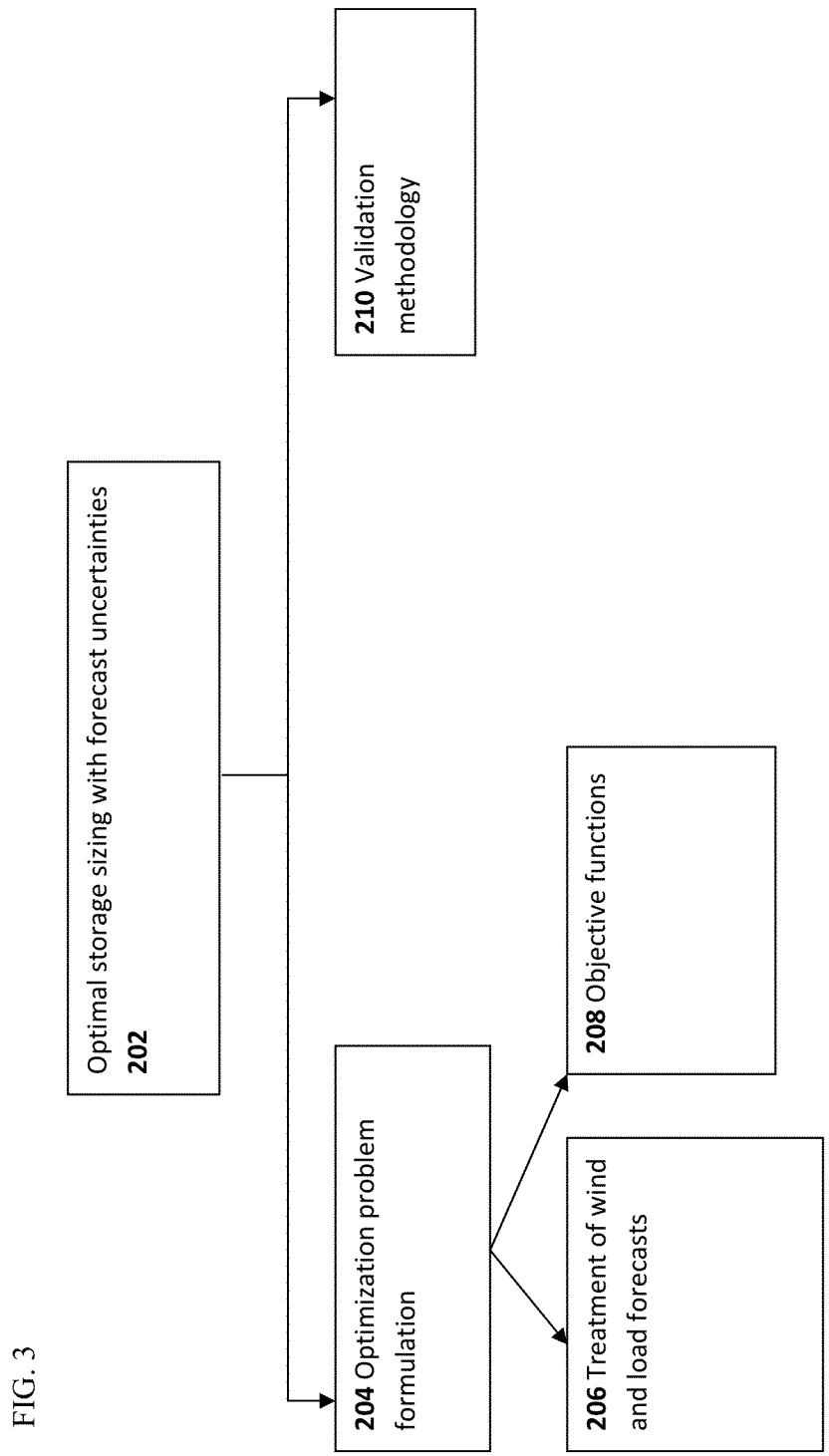
FIG. 3 shows an exemplary process to determine optimal storage.

FIG. 3 shows an exemplary process to determine optimal storage. In this process, the optimal storage sizing with forecast uncertainties are determined (202). The system can optimize the problem formulation (204), and can further perform wind and load forecast treatments (206). Objective functions can be targeted (208). From 202, validation methodologies can be done (210).

Since the variables, namely wind generation and loads are probabilistic, a stochastic linear programming model is used. As mentioned earlier, there are two optimization targets in this work, (i) optimal storage sizing while minimizing the under generation in the system thereby achieving a low or zero value of loss-of-load probability (LOLP), and (ii) optimal storage sizing while minimizing the magnitude of energy deviations, i.e. both over and under-generation. Each target corresponds to a different objective function.

Target (i)
Minimize $$C_{ES} \cdot E_{S_{max}} + C_{PS} \cdot P_{S_{max}} + C_{Einit} \cdot E_{Sinit}$$

$$\sum_{k=1}^{N} \left[ \pi \sum_{i} \rho_{W_{k_i}} \rho_{L_{k_i}} \cdot \max\{0, P_{L_{k_i}} - P_{W_{k_i}} - P_{S_k}\} \right] \quad (1)$$

Target (ii)
Minimize $$C_{ES} \cdot E_{S_{max}} + C_{PS} \cdot P_{S_{max}} + C_{Einit} \cdot E_{Sinit}$$

$$\sum_{k=1}^{N} \left[ \pi \sum_{i} \rho_{W_{k_i}} \rho_{L_{k_i}} \left| P_{L_{k_i}} - P_{W_{k_i}} - P_{S_k} \right| \right] \quad (2)$$

In each case the search space is restricted by the following constraints:

$$E_{S_{k+1}} = E_{S_k} - P_{S_k} \quad \forall k=1,2,\ldots N \quad (3)$$

$$E_{S_{min}} \leq E_{S_k} \leq E_{S_{max}} \quad \forall k=1,2,\ldots N \quad (4)$$

$$|P_{S_k}| \leq P_{S_{max}} \quad \forall k=1,2,\ldots N \quad (5)$$

Where $$\mathrm{Prob}(\widetilde{P_{W_k}} = P_{W_{k_i}}) = \rho_{W_{k_i}}$$

and $$\mathrm{Prob}(\widetilde{P_{L_k}} = P_{L_{k_i}}) = \rho_{L_{k_i}}$$

$P_{L_k}$ is the load in interval k $P_{S_k}$ is the power discharged from the storage unit in interval k with a positive value indicating discharge and a negative value indicating charging of the storage unit.

$P_{S_{max}}$ is the maximum rate of charge or discharge from the storage unit and is computed from the optimization program.

$E_{S_{max}}$ is the maximum energy limit of the storage and is computed by the optimization program, $E_{S_{min}}$ is the minimum energy required in the storage unit at the start of the planning horizon and is also computed from the optimization program. Here $E_{S_{min}}$ is taken as zero i.e. allowing deep discharge.

The capital cost of energy storage consists of an energy component, $C_{ES}$ ($/kWh) and a power component, $C_{PS}$ ($/kW). Another cost term $C_{Einit}$ ($/kWh) is introduced to reduce the dependence on initial stored energy of the storage unit to meet the objectives.

π is a constant penalty term which is chosen to be extremely high (here taken as 40,000) to minimize the effect of the energy imbalances. This term is assumed to be the product of two components, a market price in the interval (40 $/kWh), and a penalty factor over the market price for energy imbalances (1000 p.u.). N is the number of intervals considered in the planning period. The efficiency of the battery has been assumed to be 100% and no constraint has been placed on the cycle life of the battery.

As to reliability indices, loss of load probability (LOLP) can be used as a proxy for power system reliability index. Various steps of Monte Carlo can be used for computing the LOLP index. Another index SGP (Spilled Generation Probability) has also been defined and computed to measure the loss of generated wind energy due to spillage. Such an event occurs when the wind power cannot be accommodated in the system and needs to be curtailed.

Steps for LOLP and SGP calculation using simple Monte Carlo simulation can be described as follows.

Step 1: Set the maximum iteration number and let the initial iteration number n=1.

Step 2: Sample the system state randomly (load level, wind generation) based on the given forecast error distribution and perform a simulation to classify it as a loss-of-load event or a spilled generation event. Let $\alpha_n$ and $\beta_n$ be defined as follows:

$$\alpha_n = \begin{cases} 1 & \text{sampled scenario is loss-of-load event} \\ 0 & \text{otherwise} \end{cases}$$

$$\beta_n = \begin{cases} 1 & \text{sampled scenario is spilled-generation event} \\ 0 & \text{otherwise} \end{cases}$$

Please note that the sampled scenario is the entire period under study (here a week). Thus, even with the occurrence of a single time interval (here one hour) of loss of load or spilled generation, the corresponding entire period under study (the whole week) is classified as a loss-of-load or spilled-generation event. The resulting LOLP and SGP estimates respectively give the chance that a particular period (the week) will encounter at least one interval (hour) of loss of load or wind spillage.

Step 3: Calculate LOLP, SGP, and variance of the estimated LOLP and SGP.

$$\widehat{LOLP}_n = \frac{1}{n}\sum_{j=1}^n \alpha_j \quad (6)$$

$$\widehat{SGP}_n = \frac{1}{n}\sum_{j=1}^n \beta_j \quad (7)$$

$$V(\widehat{LOLP}_n) = \frac{1}{n}\left(\sum_{j=1}^n \frac{1}{n}\alpha_j^2 - \widehat{LOLP}_n^2\right) \quad (8)$$

$$V(\widehat{SGP}_n) = \frac{1}{n}\left(\sum_{j=1}^n \frac{1}{n}\beta_j^2 - \widehat{SGP}_n^2\right) \quad (9)$$

Step 4: Check whether the variations $V(\widehat{LOLP}_n)$ and $V(\widehat{SGP}_n)$ are less than a specified threshold. If true or n>Nmax, stop; otherwise, n=n+1, go to step 2.

The system has been tested on a system consisting of a commercial facility which derives its energy requirements from wind power by having installed wind turbines in its geographical campus. The policy of the commercial facility is to maximize the use of 'green' wind power and minimize energy purchased from the grid. Hence, the facility intends to invest in battery energy storage for energy balance. The problem is to find out the optimal size of the required energy storage unit. The optimal storage size required for the system in presence of wind power and load forecasts are obtained. Both the wind generation and load forecast errors are assumed to have a Gaussian probability distribution with zero mean. The wind power forecast errors are assumed to have a standard deviation of 20% of the maximum wind power generated during the week, and the load forecast errors are assumed to have a standard deviation of 2% of the peak demand. For simplicity, the standard deviations of the forecasts are considered uniform over all intervals of the period under study here. However, the formulation can also incorporate different standard deviations for different intervals. This feature is particularly important since forecast uncertainties are higher for longer-term forecasts compared to shorter-term forecasts.

The optimal storage parameters, namely the energy capacity, power capacity, and minimum initial energy required at the start of the week, are computed. For comparison, the same parameters are also computed for the system in a deterministic scenario when both the forecasts are accurate. Thus two cases are considered:

(I) Deterministic wind and deterministic load
(II) Stochastic wind and stochastic load Furthermore, in each case, the energy storage size is computed addressing two different objectives, minimizing the under-generation and hence loss-of-load probability, and simultaneous minimization of both under-generation and wind spillage. Finally, Monte Carlo simulations validate the optimal storage sizes by computing the estimates of LOLP and SGP of the system.

The above system determines an optimal sizing of an energy storage unit for energy balancing purposes. The optimal size is characterized by the optimal energy capacity and optimal power capacity of the storage unit. In addition, the minimum initial energy required to be stored at the beginning of an operational period is also obtained. The system uniquely accounts for uncertainties of both wind generation and load forecasts. The system also uses reliability indices to validate the computed optimal parameters. In addition to loss-of-load probability (LOLP), another reliability index, namely spilled-generation-probability (SGP), has been defined and computed to measure the loss of generated energy due to spillage. A stochastic linear programming method has been used to solve the optimization problem and Monte Carlo based simulations are used to compute the reliability indices.

In one test, a system consisting of wind generation and a commercial load has been tested with the system. Forecast errors of the order of 20% for wind generation and 2% for the load have been considered. The optimal storage sizing required over a week has been computed. It is found that for meeting the zero LOLP reliability criteria, the optimal storage requirement increased by about 4 times under uncertain forecasts compared to that in the accurate forecasts scenario. Also, the storage parameters found to be optimal in accurate forecasts scenario result in much higher LOLP and SGP values under uncertain forecasts.

The system is effective in determining the optimal storage size required for energy balance purposes in a renewable generation-load system taking into account forecast uncertainties and meeting required reliability criteria. The approach is also useful in assessing performance and reliability metrics of a system with existing storage facilities. Although wind generation is discussed, the system can work with any type of energy generation such as solar or thermal energy production. It should be noted that instead of commercial load, residential or industrial loads could also have been considered. Further, the analysis presented here could be extended to grid level renewable generation and loads with grid level storage technologies such as pumped hydro or compressed air energy storage.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 4:
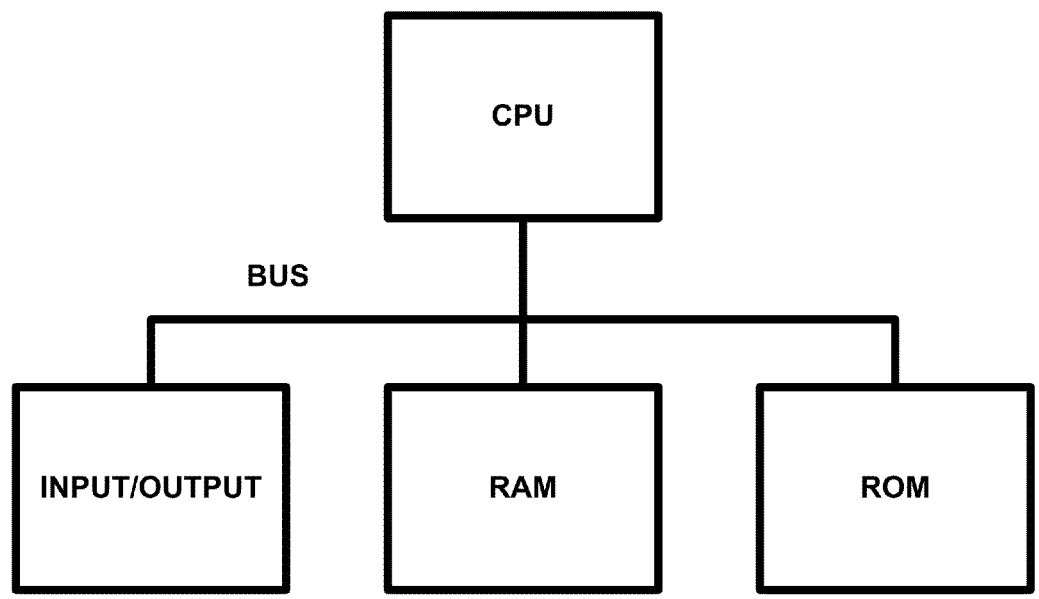
FIG. 4 shows an exemplary computer to determine optimal storage.

By way of example, a block diagram of a computer to support the system is discussed next in FIG. 4. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system to manage energy system, comprising:
   means for receiving load forecasts and power generator forecasts with uncertainty specification;
   means for performing stochastic optimization on the load and power generation forecasts;
   means for determining an optimal storage sizing for energy balancing;
   means for validating the optimal storage sizing; and
   means for minimizing $$C_{ES} \cdot E_{S_{max}} + C_{PS} \cdot P_{S_{max}} + C_{Einit} \cdot E_{Sinit}$$

$$\sum_{k=1}^{N} \left[ \pi \sum_i \rho_{W_{k_i}} \rho_{L_{k_i}} \cdot \max\{0, P_{L_{k_i}} - P_{W_{k_i}} - P_{S_k}\} \right]$$

where $C_{ES}$ is an energy component and $C_{PS}$ is a power component,
   $E_{S_{max}}$ is a maximum energy limit of a storage unit,
   $P_{S_{max}}$ is a maximum rate of charge or discharge from the storage unit,
   $C_{Einit}$ is a cost term to reduce the dependence on initial stored energy of the storage unit $E_{Sinit}$,
   $\pi$ is a constant penalty term, $$\mathrm{Prob}(\tilde{P}_{W_k} = P_{W_{k_i}}) = \rho_{W_{k_i}}$$

and $$\mathrm{Prob}(\tilde{P}_{L_k} = P_{L_{k_i}}) = \rho_{L_{k_i}},$$

$P_{L_k}$ is a load in interval k, and
   $P_{S_k}$ is a power discharged from a storage unit in interval k with a positive value indicating discharge and a negative value indicating charging of the storage unit,
   wherein the power generator is connected to an energy storage device with the optimal storage sizing.

2. The system of claim 1, comprising means for receiving minimum initial stored energy required based on storage characteristics, allowable operational limit.

3. The system of claim 1, comprising means for analyzing various levels of uncertainty of renewable generation forecasts and load forecasts.

4. The system of claim 1, comprising means for receiving reliability indices to measure 'goodness' values and trade-off assessment.

5. The system of claim 1, comprising means for determining loss-of-load probability (LOLP).

6. The system of claim 1, comprising means for determining loss-of-energy probability (LOEP) or spilled-generation-probability (SGP).

7. The system of claim 1, wherein the optimal storage sizing determination further comprises determining optimal energy capacity or optimal power capacity.

8. The system of claim 1, wherein the power generator comprises a wind generator or a solar panel.

9. The system of claim 1, comprising means for applying reliability indices to validate optimal parameters.

10. The system of claim 1, comprising means for performing stochastic linear programming to solve an optimization problem.

11. The system of claim 1, comprising means for applying Monte Carlo based simulations to determine all possible states of the system, thus evaluating the reliability indices.

12. The system of claim 1, comprising means for determining deterministic wind and deterministic load.

13. The system of claim 1, comprising means for determining or estimating stochastic wind and stochastic load.

14. The system of claim 1, comprising means for minimizing the under-generation and loss-of-load probability, and simultaneous minimization of both under-generation and wind spillage.

15. The system of claim 1, comprising code for:
restricting a search space by:

$$E_{S_{k+1}} E_{S_k} - P_{S_k} \; \forall k=1,2,\ldots N$$

$$E_{S_{min}} \leq E_{S_k} \leq E_{S_{max}} \; \forall k=1,2,\ldots N$$

$$|P_{S_k}| \leq P_{S_{max}} \; \forall k=1,2,\ldots N$$

where $P_{S_{max}}$ is a maximum rate of charge or discharge from the storage unit,
$E_{S_{max}}$ is a maximum energy limit of the storage,
$E_{S_k}$ is an energy limit of a storage unit k and $E_{S_{k+1}}$ is an energy limit of a storage unit k+1, and
$E_{S_{min}}$ is a minimum energy required in the storage unit at the start of the planning horizon.

16. The system of claim 1, comprising analyzing various levels of uncertainty of renewable generation forecasts and load forecasts.

17. The system of claim 1, comprising receiving reliability indices to measure a 'goodness' of computed values and trade-off assessment.

18. A method to manage energy system, comprising:
receiving load forecasts and power generator forecasts with uncertainty specification;
performing stochastic optimization on the load and power generation forecasts;
determining an optimal storage sizing for energy balancing;
validating the optimal storage sizing;
minimizing $$C_{ES} \cdot E_{S_{max}} + C_{PS} \cdot P_{S_{max}} + C_{Einit} \cdot E_{Sinit}$$

$$\sum_{k=1}^{N} \left[ \pi \sum_i \rho_{w_{k_i}} \rho_{L_{k_i}} |P_{L_{k_i}} - P_{w_{k_i}} - P_{S_k}| \right]; \text{ and}$$

restricting a search space by:

$$E_{S_{k+1}} = E_{S_k} - P_{S_k} \; \forall k=1,2,\ldots N$$

$$E_{S_{min}} \leq E_{S_k} \leq E_{S_{max}} \; \forall k=1,2,\ldots N$$

$$|P_{S_k}| \leq P_{S_{max}} \; \forall k=1,2,\ldots N$$

where $$\text{Prob}(\tilde{P}_{w_k} = P_{w_{k_i}}) = \rho_{w_{k_i}}$$

and $$\text{rob}(\tilde{P}_{L_k} = P_{L_{k_i}}) = \rho_{L_{k_i}},$$

$C_{ES}$ is an energy component and, $C_{PS}$ is a power component,
$E_{S_{max}}$ is a maximum energy limit of a storage unit,
$P_{S_{max}}$ is a maximum rate of charge or discharge from the storage unit,
$C_{Einit}$ is a cost term to reduce the dependence on initial stored energy of the storage unit $E_{Sinit}$,
$\pi$ is a constant penalty term,
$P_{L_k}$ is a load in interval k,
$P_{S_k}$ is a power discharged from a storage unit in interval k with a positive value indicating discharge and a negative value indicating charging of the storage unit,
$P_{S_{max}}$ is a maximum rate of charge or discharge from the storage unit,
$E_{S_{max}}$ is a maximum energy limit of the storage, and
$E_{S_{min}}$ is a minimum energy required in the storage unit at the start of the planning horizon,
wherein the power generator is connected to an energy storage device with the optimal storage sizing.

19. The method of claim 18, comprising receiving minimum initial stored energy required based on storage characteristics, allowable operational limit.

* * * * *